Dec. 9, 1952 R. A. ROBERT 2,621,000
COMPOSITE AIRPLANE
Filed Feb. 11, 1947 4 Sheets-Sheet 1

Inventor
ROGER AIME ROBERT
By Haseltine, Lake & Co.
Agents

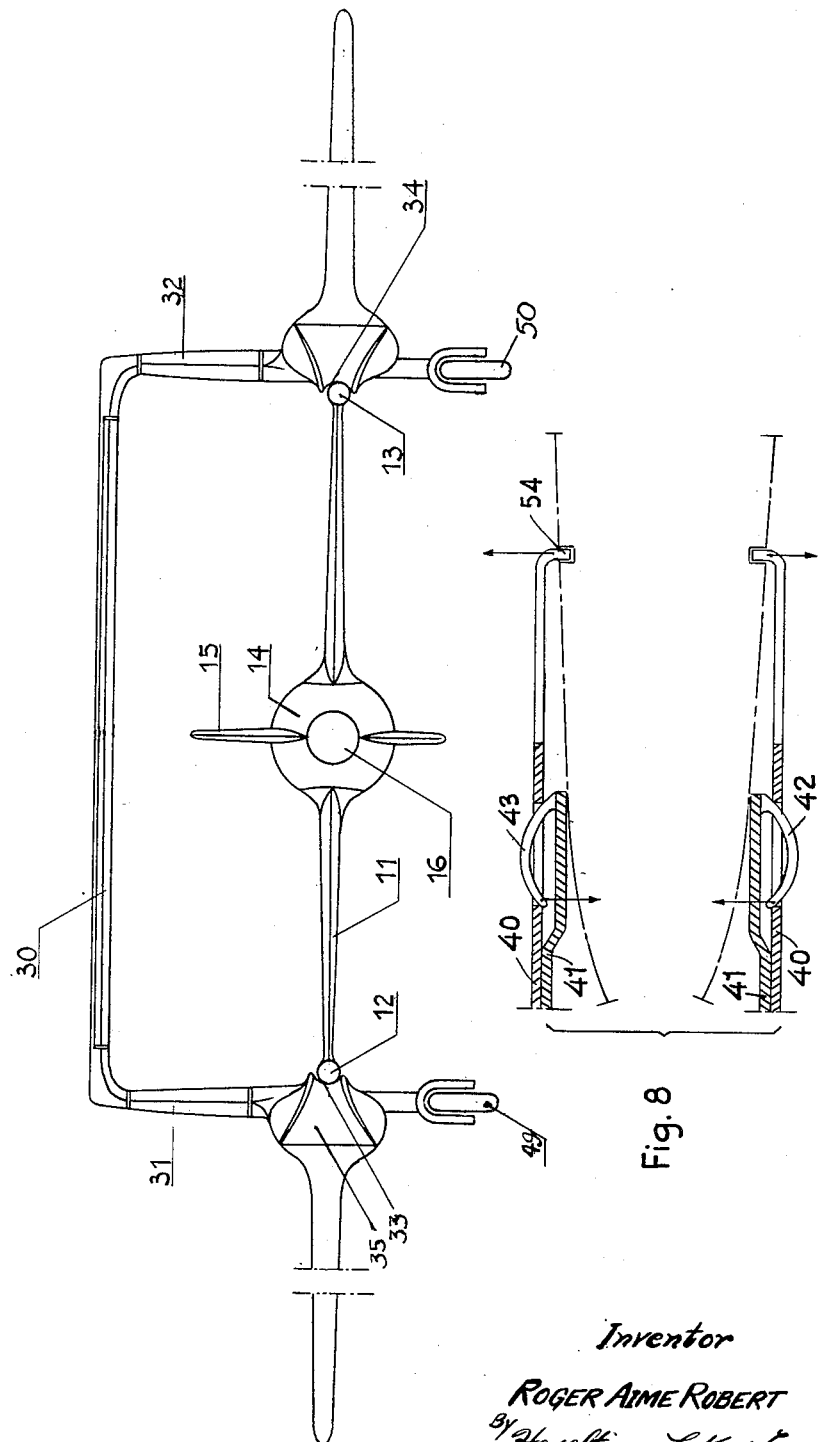

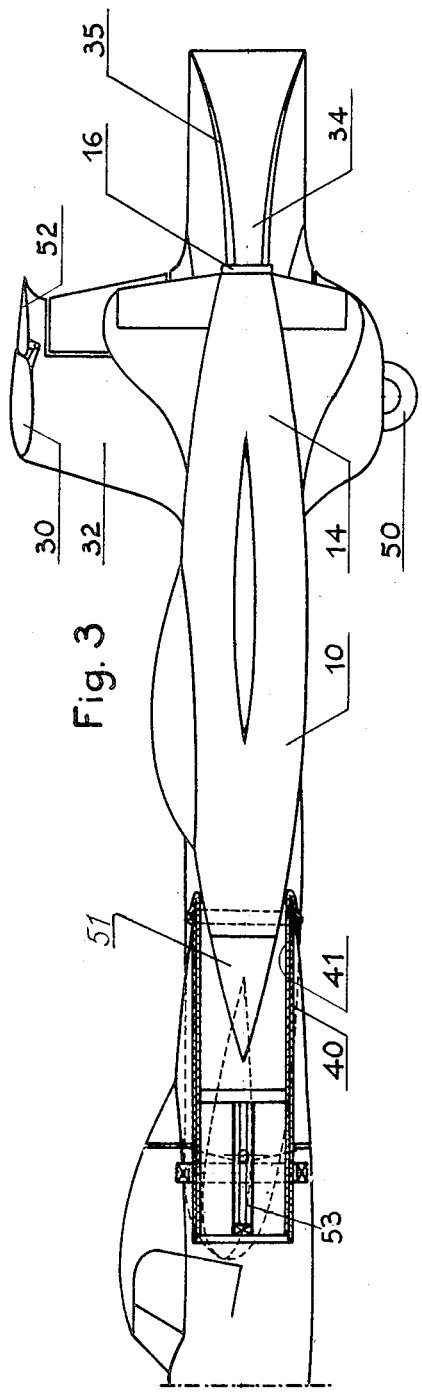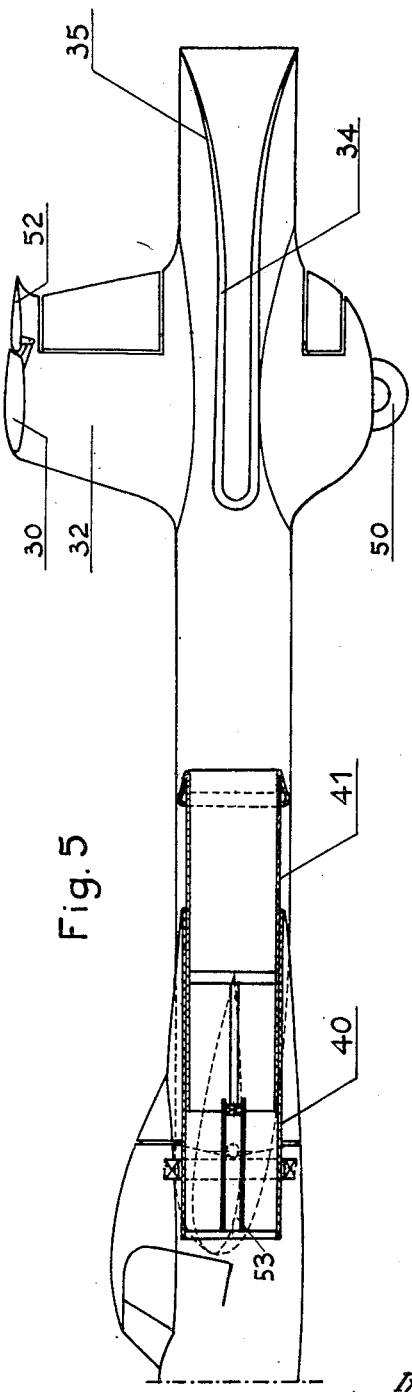

Dec. 9, 1952        R. A. ROBERT        2,621,000
COMPOSITE AIRPLANE
Filed Feb. 11, 1947        4 Sheets-Sheet 4
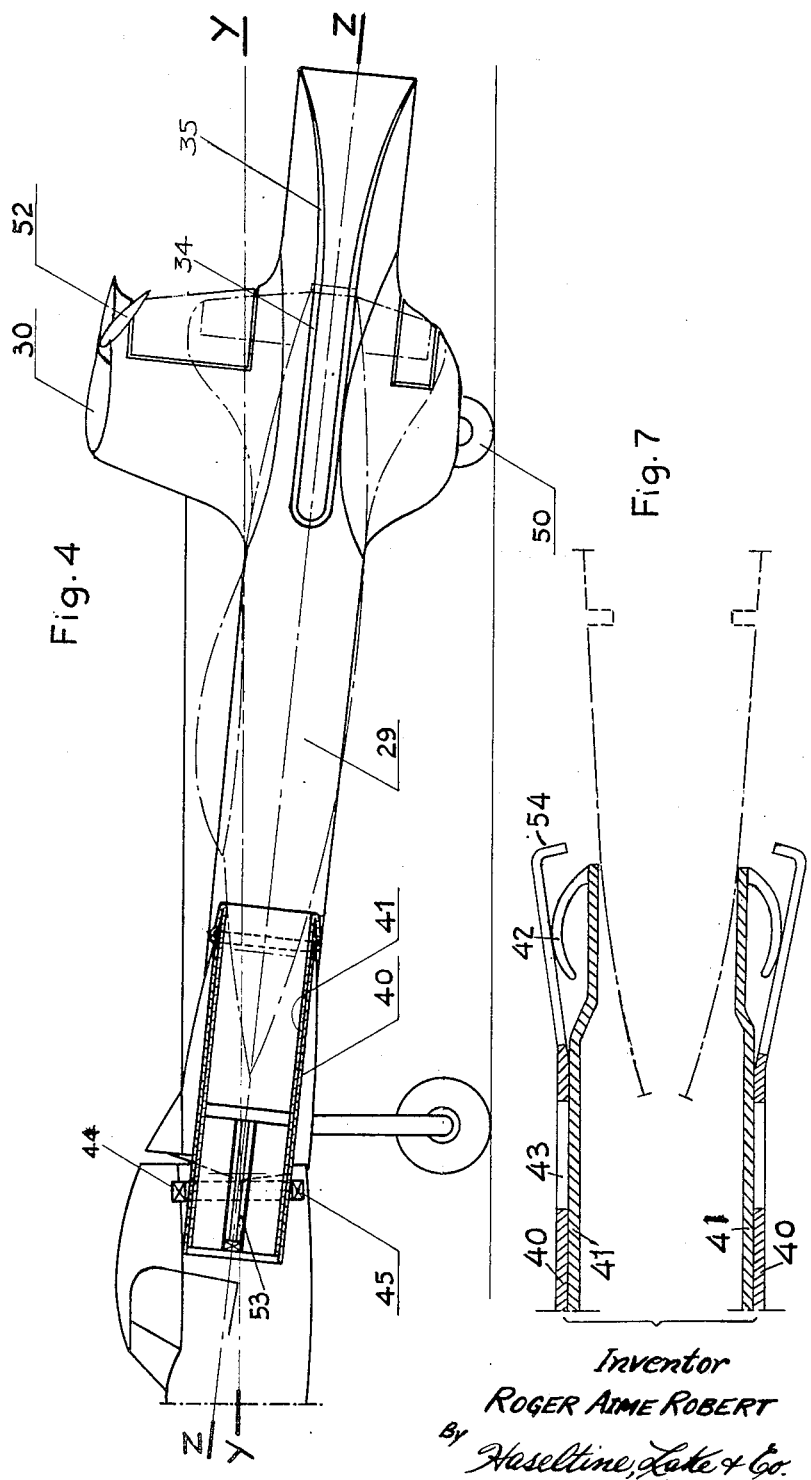
Inventor
ROGER AIME ROBERT
By *Haseltine, Lake & Co.*
Agents Patented Dec. 9, 1952

2,621,000

UNITED STATES PATENT OFFICE 2,621,000

COMPOSITE AIRPLANE

Roger Aimé Robert, Paris, France

Application February 11, 1947, Serial No. 727,915
In France February 11, 1946

24 Claims. (Cl. 244—2)

The present trend in the construction of airplanes is towards the construction of airplanes having an increasing speed. The theoretical considerations and certain practical experiments have shown that airplanes which must develop a very high speed must have a design quite different from the design of the conventional airplanes.

One of the most difficult problems raised by the construction of such super-high speed airplanes lays in take off and landing, since the design to be adopted for such high speeds does not afford a high enough lift at lower speeds.

My invention covers a composite airplane in which the problem of taking off and landing of such super high speed airplanes has been solved in a quite simple manner.

According to the invention, the super high speed airplane—for speeds below a determined speed, i. e. a speed at which said airplane may be easily operated in the air—is supported by another airplane able to take off, to fly and to land, either connected with the super high speed airplane or not.

This invention is characterized by the fact that the high speed airplane and, more generally, the carried airplane, is not rigidly connected to the low speed airplane, which will be called here the carrier, but maintained by a supporting device linked around the gravity center of the carrier.

According to the invention, the support, in the air, of the carried airplane is assisted by a lifting surface specially provided for to this end and compensating the lack of lift of the carried airplane at operating speeds of the composite airplane.

Thus the carrier may correctly fly either loaded with the super high speed airplane or not.

The supporting means for the high speed airplane is preferably constituted by a frame which is pivotally mounted to rotate about a lateral axis passing through the gravity center of the carrier and the longitudinal sides of which are a part of both fuselages of said airplane.

The lifting surface provided for increasing the lift of the high speed airplane constitutes the fourth side of this frame. It is offset in the vertical direction to give way to the high speed airplane. Its support may be constituted by the vertical fins of the carrier.

The high speed airplane, located inside the frame, has its nose fixed by a central nacelle of the carrier and the wing ends inserted into guide tracks provided in the fuselages of the low speed airplane.

A shock absorber is provided to damp the shock which may take place at the instant of connection of the airplanes. Said shock absorber is located by example in the central nacelle.

In the following specification of a composite airplane according to the invention, an example of construction is described, reference being made to the enclosed drawing in which:

Fig. 2 shows a corresponding rear view;

Fig. 3 is a partial longitudinal section of the composite airplane in flight;

Fig. 4 is a partial longitudinal section of the composite airplane on the ground;

Fig. 5 is a partial longitudinal sectional view of the carrier in flight, ready to receive the high speed airplane;

Fig. 7 is a fragmentary, axial sectional view of suitable means for locking the carried airplane to the carrier airplane and shown in the position assumed when the nose of the carried airplane first begins entry therein; and Fig. 8 is a view similar to Fig. 7, but showing the positions of the parts after the locking engagement has been effected.

Figures 1, 6:
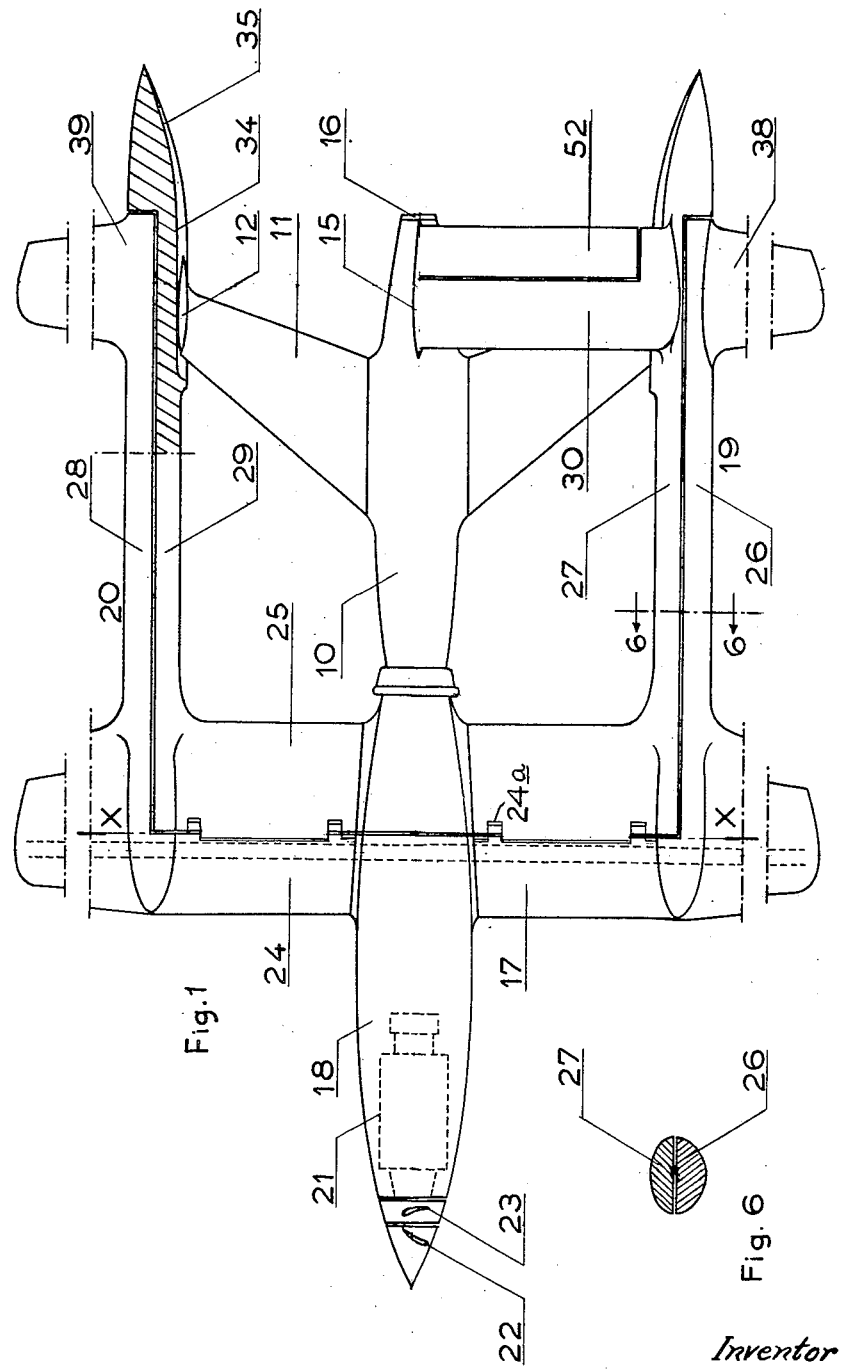
Fig. 1 is a plan of the composite airplane, in flight, and partly broken away and in section.
Fig. 6 is a section according to the line 6—6 of Fig. 1.

The carrying airplane which will be described is designed to receive a high speed airplane comprising a fuselage 10 and a V-shaped wing 11 with the apex forwards. The ends of the wing are fitted with streamlined guide members 12 and 13, the function of which will be later described. A fin 15 is fitted at rear end 14 of the fuselage.

In the example shown, the very high speed airplane is equipped with a reaction engine, with exhaustion of the gas through the nozzle 16.

The carrier comprises a main wing 17, a central nacelle 18 and two side fuselages 19 and 20. The central nacelle accommodates the crew and the engine installation 21 driving two propellers 22 and 23 revolving in opposite directions.

According to an alternative, the propellers are located at fore ends of the side fuselages, each being driven by an engine.

Between both fuselages, the main wing 17 comprises a part 24 rigid with the central nacelle 18 and a part 25, rotatively mounted on the trailing edge of the rigid part 24 by a suitable hinge construction 24a for rotation about a lateral axis X—X passing through the gravity centre of the carrier or very close to said gravity center.

In the area where it extends through the central nacelle the spar is bifurcated to provide an upper branch 44 and a lower branch 45.

The side fuselages 19 and 20 consist in two parts longitudinally assembled. The fuselage 19 comprises a first part 26 rigid with the fixed part 24 of the wing, and a second part 27, rigid with the movable part 25. The fuselage 20 comprises in a similar manner two parts 28 and 29. The parts 25, 27 and 29 form the three sides of a frame linked around a center line X—X, the fourth side being constituted by an additional wing 30, supported on posts 31 and 32, preferably formed by the vertical fins of the carrier. At rear ends of parts 27 and 29 are provided guide tracks 33 and 34 with a backwards progressively increasing enlargement 35.

The movable part 25 of the main wing is fitted with a cylinder 40, rigid with the fixed part of a shock absorber 53 and into which may slide a cylinder 41 rigid with the movable part of said shock absorber.

The front part of the cylinder 40 is located between the branches 44 and 45 of the spar which for this purpose is bifurcated in the area thereof which extends through the central nacelle.

Referring to Figs. 7 and 8, suitable structure is there shown for effecting the locking of the cylinders 40 and 41 relative to each other in their telescoped condition and for releasably retaining the nose of the fuselage of the carried airplane within the inner cylinder 41. Such structure may include outwardly extending detent members 42 on the rear end of cylinder 41 for resilient engagement in apertures 43 formed in the outer cylinder 40 and operative to hold the cylinders telescoped, against the force of the shock absorber, after the carried airplane has pushed the cylinder 41 into the cylinder 40 during attachment of the airplanes (Fig. 8). The carried airplane may be held to the cylinder 40 by resilient hook-like members 54 extending from the outer cylinder 40 and urged radially outward by the detent members 42 when the cylinder 41 is extended for receiving the carried airplane (Fig. 7).

When the cylinder 41 is displaced into the outer cylinder by the forward push of the faster moving carried airplane, during attachment of the latter, the resilient members 54 are free to spring radially inward to engage in suitable locking recesses provided in the nose portion of the carried airplane (Fig. 8).

In order to release the carried airplane, suitable releasing linkages (not shown) operative to impose forces represented by the arrows of Fig. 8 are connected to the members 54 for springing the latter out of the recesses of the nose of the carried airplane. Similarly, linkages (not shown) are connected to the detent members 42 to pull the latter inwardly, as represented by the arrows of Fig. 8, and thereby free the members 42 from the apertures 43 so that the shock absorber may then urge the inner cylinder 41 rearwardly to the position for receiving the carried airplane.

The carrier is fitted with a landing gear and equipped furthermore with two tail gear wheels 49 and 50 rigid with the movable frame.

For the taking off, the high speed airplane is supported by the carrier. Its nose 51 is supported in cylinder 41 and the ends of its wings are maintained by its guiding members 12 and 13 within the guiding tracks 33 and 34. According to an alternative, the nose of the high speed airplane is supported by two parallel slides.

On the ground, the composite airplane rests on its proper landing gear which comprises the lateral wheels shown on Fig. 4 and a nose wheel (not shown) as well as on its tail gear 49 and 50, the longitudinal center line Y—Y of the fixed part of the carrier and the center line Z—Z of the movable frame—which is also the center line of the carrier airplane—being at an angle.

The engine set of the carrier is started as well as the engine of the carried airplane.

The flaps 52 of the auxiliary wing 30 are deflected, the composite airplane taxies at an increasing speed.

Under the action of the lift of the auxiliary wing 30, the tail wheels 49 and 50 will raise over the ground, the movable frame will pivot on its center line X—X, both center lines Y—Y and Z—Z getting progressively into coincidence. Then the composite airplane takes off due to increase in speed and climbs.

To free the high speed airplane, the pilot of the carrier increases the speed of his engine. Simultaneously, the pilot of the carried airplane adjusts the power of his engine so that, under its sole action, the speed would be high enough to perform the lift at a speed lower than that of the carrier.

If by example, the minimum flying speed of the high speed airplane is 300 miles per hour, the power of the engine of said airplane will be adjusted to a figure corresponding to 325 miles per hour, the composite airplane flying at 350 miles per hour.

The release of the locking device of the high speed airplane to the carrier is then operated. Under the sole action of its engine, the high speed airplane flies at a lower speed than the carrier, now free of its charge and will leave the carrier. However, its speed is high enough to fly under normal operating conditions.

According to the invention, for landing, the high speed airplane is again connected to the carrier. To this end, the carrier, flying in a straight line, is brought to its maximum speed, by example 350 miles per hour.

The high speed airplane is manœuvred to come behind the carrier at a speed slightly over the speed of the latter, by example 375 miles per hour. The movable part 41 is then extended (into position shown in Fig. 5). The pilot of the high speed airplane brings the center line of his airplane into coincidence with the center line of the carrier, directing the nose 51 of his airplane towards the opening in cylinder 41. The nose 51 is inserted into the cylinder 41 and the guide members 12 and 13 enter the tracks 33 and 34 at their enlarged part 35.

The cylinder 41 is then forced inside the cylinder 40 against the braking action of the shock absorber 53. The nose 51 locks itself within the cylinder 41, and the cylinder 41 is locked to cylinder 40.

The composite airplane is thus reconstituted, and will land as usual.

This assembly of both airplanes may be used to refill the fuel supply of the high speed airplane which may be then again released for a new mission, as already described.

The invention foresees also the use of a distant control operated either from the carrier or from the high speed airplane for the automatic assembly of both airplanes as soon as they are in the vicinity of one another, with their center lines in coincidence.

Having now particularly described and ascertained the nature of my said invention and in what manner the same is to be performed, I declare that what I claim is:

1. A composite airplane comprising a carrying airplane, two fuselages forming part of said airplane, one central nacelle, a carried airplane including a fuselage and a wing extending therefrom, means to temporarily assemble the nose of the carried airplane to the central nacelle and its both wing ends to both fuselages, means to absorb the shock between the carrying airplane and the carried airplane, when both planes join together, locking means to rigidly fix the carried airplane to carrying airplane.

2. A composite airplane comprising a carrying airplane, two fuselages for said airplane, a central nacelle, a carried airplane, including a fuselage having a nose at front end thereof and a wing extending from said fuselage means to temporarily assemble the nose of the carried airplane to the central nacelle and its both wing ends to both fuselages, means to absorb the shock between the carrying airplane and the carried airplane, when both planes join together, comprising a shock absorber cylinder which, to receive the carried airplane, projects from the central nacelle.

3. A composite airplane comprising a carrying airplane, comprising a wing, a central nacelle, two fuselages, a tail fin, a supporting frame linked on a cross line in the vicinity of the gravity center of this airplane, two sides of said frame being a part of said fuselages, a central nacelle, the composite airplane comprising further a carried airplane, comprising in turn a wing, a fuselage, a nose at fore end of the fuselage, removable assembly means between the nose of the carried airplane and the central nacelle of the carrying airplane, guiding means on the sides of the supporting frame and cooperating with the ends of the wing of the carried airplane.

4. In a composite aircraft, in combination, a carrier aircraft comprising two longitudinal members parallel to the longitudinal middle plane thereof, means on each of said members for supporting an aircraft wing tip, a transverse member constituting with both said longitudinal members a three-sided frame having an open fourth side, on said transverse member means for maintaining an aircraft nose, a carried aircraft having a wing-tip span substantially equal to the transverse spacing between said longitudinal members and comprising a wing supported at its tips in said means.

5. In a composite aircraft, in combination, a carrier airplane, a carried airplane, a frame mounted for rotation on a transverse axis of said carrier airplane and said frame including two longitudinal members of said carrier airplane disposed on either side of the longitudinal middle plane thereof at a distance from each other substantially equal to the wing-span of said carried airplane and a transverse member connecting said longitudinal members, and means on said longitudinal and transverse members for supporting within said frame said carried airplane with the axis thereof contained in the longitudinal middle plane of said carrier airplane, the axis of rotation of said frame extending close enough to the center of gravity of said carrier airplane so that the release of said carried airplane will not destroy the equilibrium of said carrier airplane.

6. In a composite aircraft, in combination, a carrier airplane comprising a sustaining surface, two transversely spaced lateral fuselage structures symmetrically on respective sides of a longitudinal center plane, a three-sided frame rotatably mounted on an axis transverse to the plane of symmetry of said aircraft, one of said sides forming part of said sustaining surface and the other two sides forming parts of respective ones of said lateral fuselages, a carried airplane, and means for supporting said carried airplane in the frame with its longitudinal axis within the plane of symmetry of said carrier airplane.

7. In a composite aircraft, in combination, a carrier airplane comprising a lifting surface, two side fuselages symmetrically disposes on each side of a longitudinal center plane, a frame mounted for rotation on a transverse axis, said frame having longitudinal sides forming parts of said side fuselages respectively and a transverse side forming part of said lifting surface, a carried airplane, means for releasably supporting said carried airplane in said frame with its axis contained in the middle plane of the carrier aircraft, means spaced from said transverse axis for supporting on the ground said frame supporting said carried airplane, aerodynamic means for causing said carried airplane supported in its frame to be the first to take off, said frame being adapted to rotate until the axis of said carried airplane comes into alignment with the axis of said carrier airplane, and means for releasing said means maintaining said means supporting the carried airplane in said frame to thereby free said carried airplane, the axis of rotation of said frame being close enough to the center of gravity of said carrier airplane for the release of said carried plane not to destroy the equilibrium of said carrier airplane.

8. A composite aircraft as in claim 7, wherein said aerodynamic means comprise a complementary lifting surface carried by said frame and parallel to and distant from said axis of rotation.

9. A composite aircraft as in claim 7, wherein said aerodynamic means comprise a complementary lifting surface carried by said frame parallel to and distant from said axis of rotation, said lifting surface being spaced from the plane of said frame.

10. A composite aircraft as in claim 7, wherein said aerodynamic means comprise a complementary lifting surface carried by said frame, parallel to and distant from said transverse side, and a flap on said lifting surface extending throughout a major portion of the span thereof.

11. In a composite aircraft, in combination, a carrier airplane comprising a wing, two side fuselages connected with said wing and extending symmetrically on both sides of a longitudinal center plane, a wing portion between said side fuselages mounted for rotation on a transverse axis of said plane, side fuselage portions secured to the ends of said wing portion, vertical empennage elements at the rear ends of said side fuselage portions, a sustaining surface between said vertical empennage elements, a carried airplane comprising a central fuselage, a wing, means for supporting the wing-tips of said carried airplane in said side fuselage portions of said carrier airplane, and means for supporting the forward end of the fuselage of said carried airplane within said wing portion of said carrier airplane, the plane of symmetry of said carrier airplane and said carried airplane being common.

12. A composite aircraft as in claim 11, wherein the rear ends of said side fuselage portions are formed with guide-ways and the wing-tips of said carried airplane are formed with guide-means cooperating with said guide-ways.

13. A composite aircraft as in claim 11, wherein the rear ends of said side fuselage portions are formed with rearwardly-flared guide-ways and the wing-tips of said carried airplane are formed with complementarily tapered guide elements cooperating with said guide-ways.

14. In a composite aircraft as in claim 11, means for provisionally connecting with said wing portion the forward end of the fuselage of said carried airplane, and shock-absorbing means for damping the impact between said carried airplane and said carrier airplane upon contact engagement therebetween.

15. In a composite aircraft structure, in combination, a carrier airplane comprising a wing, two side fuselages connected with said wing symmetrically spaced on both sides of a longitudinal center plane, a wing portion between said side fuselages, means allowing relative rotation between said wing portion and the remainder of said wing around an axis transverse to said plane, side fuselage portions at the ends of said wing portion, rigidly connected therewith, an aperture centrally of said wing portion, a carried airplane comprising a forwardly tapered center fuselage, a wing, means for supporting the wing-tips of said wing through said side fuselage portions of said carrier airplane, and means for releasably locking said tapered fuselage portion of said carried airplane in said aperture of said carrier-airplane wing-portion.

16. In a composite aircraft, in combination, a carrier aircraft comprising a wing, two side fuselages connected with said wing and symmetrical on each side of the longitudinal center plane of said aircraft, a wing portion between said side fuselages, means allowing relative rotation around an axis transverse to said plane between said wing portion and the remainder of said wing, longitudinal slideways formed on said wing portion and transversely-spaced from each other, a carried plane comprising a central fuselage and a wing extending therefrom, means for supporting the wing-tips of said carried airplane in said side fuselage portions of said carrier airplane, and supporting means carried by said wing portion between said side fuselages for releasably supporting said fuselage of said carried airplane.

17. A composite aircraft as in claim 7, wherein said carrier airplane comprises propulsion means arranged forwardly of said supporting surface along the longitudinal central line of said carrier airplane and said carried airplane comprises propulsion means arranged along said longitudinal central line.

18. A composite aircraft as in claim 7, wherein said carrier airplane comprises a screw-propulsion means forwardly of said lifting surface along the longitudinal central line of said carrier airplane and said carried airplane comprises a jet-reaction propulsion means disposed along said longitudinal central line with a rearwardly directed exhaust.

19. A carrier aircraft for a further aircraft, which comprises a supporting frame for the carried aircraft, said fame mounted for rotation about a transverse line extending substantially through the center of gravity of the carrier aircraft and a lift surface including a lift member supported by said frame and spaced from said transverse line.

20. Composite aircraft which comprises an airscrew-driven carrier aircraft, two longitudinal supporting structures arranged symmetrically with respect to the longitudinal center line of said carrier aircraft, a carried aircraft disposed between said supporting structures and supported by said structures with its longitudinal center line substantially coincident with the longitudinal center line of said carrier aircraft, and means on said carried craft for discharging a reaction gas jet substantially coaxially with said common longitudinal center line.

21. In a composite aircraft, a carrier aircraft comprising a three-sided rectangular structure mounted through one of its sides rotatively around an axis transverse to the longitudinal plane of symmetry of said carrier aircraft, both other sides being adjacent to said side, and means on said structure for supporting an aircraft therein.

22. In a composite aircraft including in assembly a carrier aircraft and a carried aircraft, interconnecting means for said carried to said carrier aircraft which comprise: a structure mounted on said carrier craft for rotation about an axis extending substantially through the center of gravity thereof, said structure enframing and supporting the carried aircraft with the center line thereof in parallel relationship to the longitudinal center plane of the said carrier aircraft 23. In a composite aircraft formed by the assembly of a carrier with a carried aircraft, a carrier aircraft having a wing structure, a gap in said wing structure, a carried aircraft housed in said gap, and supporting means on the edges of said gap for supporting said carried aircraft therein.

24. In a composite aircraft, a carrier aircraft comprising a wing and two laterally spaced fuselages, and a carried aircraft enframed and releasably supported in the three-sided frame defined by said wing and said fuselages.

ROGER AIMÉ ROBERT.

REFERENCES CITED

The following references are of record in the file of this patent:

UNITED STATES PATENTS

| Number | Name | Date |
|---|---|---|
| 1,394,630 | Loening | Oct. 25, 1921 |
| 1,650,346 | Hall | Nov. 22, 1927 |
| 1,721,437 | Durham | July 16, 1929 |
| 1,872,811 | Reel | Aug. 23, 1932 |
| 2,062,599 | North | Dec. 1, 1936 |
| 2,316,885 | Ortega | Apr. 20, 1943 |
| 2,323,279 | Van Zelm | June 29, 1943 |
| 2,367,538 | Sullivan | Jan. 16, 1945 |
| 2,399,216 | Fahrney | Apr. 30, 1946 |
| 2,421,742 | Buettner | June 10, 1947 |
| 2,471,599 | Young | May 31, 1949 |

FOREIGN PATENTS

| Number | Country | Date |
|---|---|---|
| 426,335 | France | May 1, 1911 |
| 546,587 | Great Britain | July 20, 1942 |
| 566,201 | Great Britain | Dec. 19, 1944 |